(12) United States Patent
Zou et al.

(10) Patent No.: US 12,453,961 B2
(45) Date of Patent: Oct. 28, 2025

(54) CHROMIUM CATALYST, ITS PREPARATION AND USE

(71) Applicant: BASF Corporation, Florham Park, NJ (US)

(72) Inventors: Weiqing Joe Zou, Twinsburgh, OH (US); David James Brockway, Mentor, OH (US); Peter Pfab, Neustadt (DE); Matthias Georg Schwab, Mannheim (DE)

(73) Assignee: BASF Corporation, Florham Park, NJ (US)

( * ) Notice: Subject to any disclaimer, the term of this patent is extended or adjusted under 35 U.S.C. 154(b) by 605 days.

(21) Appl. No.: 17/839,906

(22) Filed: Jun. 14, 2022

(65) Prior Publication Data

US 2022/0314203 A1 Oct. 6, 2022

Related U.S. Application Data

(62) Division of application No. 16/302,577, filed as application No. PCT/US2017/033803 on May 22, 2017, now Pat. No. 11,389,786.

(Continued)

(51) Int. Cl.
```
B01J 23/26      (2006.01)
B01J 35/31      (2024.01)
B01J 35/32      (2024.01)
B01J 35/61      (2024.01)
B01J 35/63      (2024.01)
```
(Continued)

(52) U.S. Cl.
CPC .............. *B01J 23/26* (2013.01); *B01J 35/31* (2024.01); *B01J 35/32* (2024.01); *B01J 35/615* (2024.01); *B01J 35/633* (2024.01); *B01J 35/635* (2024.01); *B01J 35/638* (2024.01); *B01J 35/80* (2024.01); *B01J 37/0236* (2013.01); *B01J 37/031* (2013.01); *B01J 37/035* (2013.01); *B01J 37/16* (2013.01); *B01J 2235/15* (2024.01)

(58) Field of Classification Search
CPC . B01J 23/26; B01J 35/615; B01J 35/31; B01J 35/633; B01J 35/635; B01J 35/638; B01J 35/50; B01J 37/0236; B01J 37/031; B01J 37/035; B01J 37/16
See application file for complete search history.

(56) References Cited

U.S. PATENT DOCUMENTS

| | | |
|---|---|---|
| 3,974,101 A | 8/1976 | Witt |
| 4,717,701 A | 1/1988 | McDaniel |

(Continued)

FOREIGN PATENT DOCUMENTS

WO   1995031283   11/1995

OTHER PUBLICATIONS

International Search Report & Written Opinion for International Application No. PCT/US2017/033803 mailed on Aug. 29, 2017, 18 pages.

*Primary Examiner* — James A Fiorito
(74) *Attorney, Agent, or Firm* — Peter DiMauro

(57) ABSTRACT

Disclosed herein is a chromium oxide catalyst composition having reduced levels of chromium (VI), methods of making a chromium oxide catalyst composition and system, and illustrative uses of the chromium oxide catalyst composition and system. The catalyst disclosed may be a gel and may comprise chromium(III) oxide and chromium(VI) oxide at an amount of about 10,000 ppm or less based on total chromium oxide contents in the chromium oxide catalyst composition.

19 Claims, 1 Drawing Sheet

Related U.S. Application Data

(60) Provisional application No. 62/340,134, filed on May 23, 2016.

(51) Int. Cl.
  *B01J 35/80* (2024.01)
  *B01J 37/02* (2006.01)
  *B01J 37/03* (2006.01)
  *B01J 37/16* (2006.01)

(56) References Cited

U.S. PATENT DOCUMENTS

| | | |
|---|---|---|
| 4,828,818 A | 5/1989 | Carlson et al. |
| 4,912,270 A | 3/1990 | Carlson et al. |
| 5,656,566 A | 8/1997 | Ward |
| 6,063,826 A | 5/2000 | Biesmans et al. |
| 9,000,242 B2 | 4/2015 | Lui et al. |
| 9,862,659 B2 | 1/2018 | Sharratt |
| 2001/0011061 A1 | 8/2001 | Scott et al. |
| 2003/0202933 A1 | 10/2003 | Gash et al. |
| 2013/0203947 A1 | 8/2013 | Moineau et al. |
| 2015/0360961 A1 | 12/2015 | Oikawa et al. |

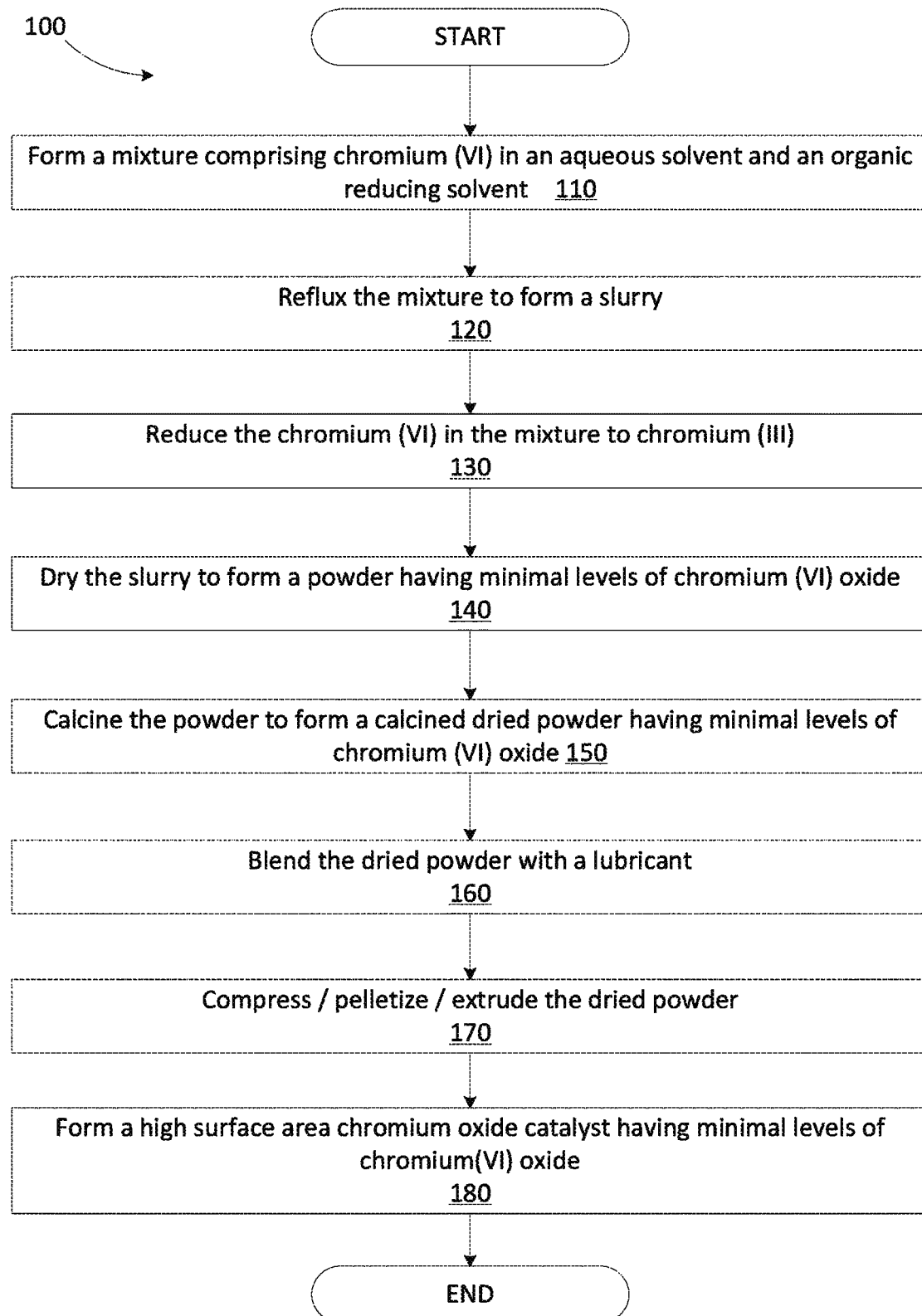

ND USE

CROSS-REFERENCE TO RELATED APPLICATIONS

This application is a divisional application of U.S. Non-Provisional patent application Ser. No. 16/302,577, filed on Nov. 16, 2018, which is a national stage entry under 35 U.S.C. § 371 of International Application No. PCT/US2017/033803, filed on May 22, 2017, which claims the benefit of priority of U.S. Provisional Patent Application No. 62/340,134, filed on May 23, 2016, the disclosures of which are hereby incorporated by reference herein in their entireties.

TECHNICAL FIELD

The present disclosure relates to a chromium catalyst composition and to a chromium catalyst system with reduced levels of chromium(VI) oxide as well as to methods for preparing the chromium catalyst composition and system and their use.

BACKGROUND

Chromium(VI), also known as hexavalent chromium and Cr(VI), is a toxic form of the element chromium. Hexavalent chromium has many different industrial applications acting a precursor or as an intermediate. Some of its uses include chromate pigments in dyes, paints, inks and plastic; chromium catalysts; an anti-corrosive chromium agent added to paints, primers, and other surface coatings; chrome electroplating; welding and hotworking chrome alloys and chrome coated metals. It may also be present as an impurity in portland cement. Exposure to high levels of hexavalent chromium could have short and long term health consequences to employees in these industries. Short term consequences could affect the nose, throat, lungs, and skin. Some of the symptoms include irritation to the nose and throat, runny nose, sneezing, coughing, itching, burning sensation, wheezing, shortness of breath, swelling, a red itchy rash, and a chrome ulcer upon direct skin contact with hexavalent chrome. The long term consequences include irritation and damage to the respiratory tract, eyes, and skin and in some instances even lung cancer. In fact, regulatory agencies consider all Cr(VI) compounds to be occupational carcinogens.

Commercially available chromium(III) oxide catalysts ($Cr_2O_3$) are synthesized by a plurality of routes including 1) a sol-gel process where suitable precursors such chromic acid or chromium(VI) oxide ($CrO_3$) are reduced with organic chemicals and 2) a precipitation process where chromium hydroxide is precipitated and treated to form chromium(III) oxide and 3) a thermal process where suitable chromium precursor compounds are thermally converted to form chromium(III) oxide and volatile by-products. Experimental results illustrate that the catalysts resulting from currently available routes have a rather high Cr(VI) content that does not meet the latest toxic and hazardous substances regulations. This shortcoming may render their production, handling, operation and disposal impractical in particular on industrial scale.

Cr(VI) reduction has been the focus in the last few decades in areas of environmental remediation of Cr(VI) pollution in water and soil and Cr(VI) exposure to employees. While methods that combine reducing agents, chelating agents, and organic chemicals have contributed significantly to environmental clean-up and wastewater treatment of Cr(VI), these methods have not been found applicable for industrial scale production of $Cr_2O_3$ material for catalyst applications with low Cr(VI) levels.

There is a need in the art for chromium catalysts with minimal Cr(VI) levels and to identify an industrially applicable process for producing $Cr_2O_3$ material for chromium catalyst applications.

SUMMARY

Disclosed herein are chromium oxide catalyst compositions and chromium oxide catalyst systems with minimal Cr(VI) oxide content, processes of their preparation, methods of their use, and their various applications.

In some embodiments, the invention is directed to a process for preparing a chromium oxide catalyst composition, the process comprising: forming a mixture comprising chromium(VI) oxide in an aqueous solvent and in an organic reducing solvent; refluxing the mixture to form a slurry; and drying the slurry to form a powder having chromium(VI) oxide at an amount of about 10,000 ppm or less based on total chromium oxides content in the dried powder. In some embodiments, the dried powder may be calcined. In some embodiments, the dried powder or the dried calcined powder may further be blended with a lubricant, such as graphite. In some embodiments, the dried powder or the dried calcined powder, whether or not blended with a lubricant, may be compressed into various shapes (e. g. to form tablets), pelletized, or processed by extrusion techniques (e. g. to form extrudates)

In some embodiments, a mixture of chromium(VI) in an aqueous solvent and in an organic reducing solvent may be formed by first dissolving chromium(VI) oxide in an aqueous solvent to form a solution (designated as "solution A") and thereafter adding the organic reducing solvent to solution A to form a slurry. In other embodiments, the mixture may be formed by first dissolving chromium(VI) oxide in an aqueous solvent to form solution A and thereafter adding solution A into the organic reducing solvent. In yet other embodiments, the mixture may be formed by first mixing the aqueous solvent with the organic reducing solvent and thereafter adding chromium(VI) oxide into the mixture.

In some embodiments, the dried powder, dried calcined powder, blended powder, compressed powder, pelletized powder, extruded powder and/or all other solid intermediates in the process may have chromium(VI) oxide at an amount of about 10,000 ppm or less, about 5,000 ppm or less, about 2,000 ppm or less, about 1,000 ppm or less, about 500 ppm or less, about 250 ppm or less, or about 100 ppm or less based on total chromium oxides content in the solid intermediate.

In some embodiments, the invention is directed to a process for preparing a chromium oxide catalyst composition, the process comprises reducing the chromium(VI) to a chromium(III). In some embodiments, the process comprises oxidizing the organic reducing solvent. In some embodiments, the molar ratio of the organic reducing solvent to the chromium(VI) oxide may range from about 0.2 to about 4.0, from about 0.3 to about 3.0, from about 0.4 to about 2.0, from about 0.5 to about 1.5, from about 0.6 to about 1.3, from about 0.75 to about 1.5, or from about 1 to about 1.25.

In one embodiment, the aqueous solvent may comprise water. In some embodiments, the organic reducing solvent may comprise an alcohol, an aldehyde, a carboxylic acid, or combinations thereof. In one embodiment, the alcohol may comprise isobutyl alcohol. In an embodiment, the organic reducing solvent may comprise benzyl alcohol. In an embodiment, the organic reducing solvent may comprise a combination of ethanol and isobutyric acid or a combination of ethanol and acetic acid. The mixture of aqueous solvent and organic reducing solvent may form a binary phase mixture or a ternary phase mixture. In some embodiments, the organic reducing solvent acts as a solvent and as a reducing agent. In some embodiments, no additional reducing agents, solvents, or chelating agents are added to the process.

In one embodiment, when the aqueous solvent comprises water and the organic reducing solvent comprises isobutyl alcohol, the process may comprise: dissolving chromium (VI) oxide in water; oxidizing the isobutyl alcohol to form isobutyraldehyde and isobutyric acid; and reacting the isobutyric acid with the dissolved chromium(VI) oxide to form acetone and carbon dioxide.

In some embodiments, the invention is directed to a process for preparing a chromium oxide catalyst composition, wherein the catalyst composition may be an amorphous gel. In some embodiments, the amorphous gel may be about 80% or more, about 85% or more, about 90% or more, about 95% or more, about 98% or more, about 99% or more, or about 100% amorphous. In some embodiments, the amorphous gel may be a xerogel.

In some embodiments, the invention is directed to a catalyst composition prepared by a reduction route. In other embodiments, the invention is directed to a catalyst composition prepared by a precipitation route. In yet other embodiments, the invention is directed to a catalyst composition prepared by a thermal decomposition route. The reduction, the precipitation and the thermal decomposition routes will be discussed in further detail below. In some embodiments, the invention may be directed to a chromium oxide catalyst composition prepared by other routes which would yield a chromium oxide catalyst composition as disclosed herein.

In some embodiments, the invention is directed to a chromium oxide catalyst composition comprising: a chromium(III) oxide and a chromium(VI) oxide, wherein the chromium(VI) oxide may be present at an amount of about 10,000 ppm or less, about 5,000 ppm or less, about 2,000 ppm or less, about 1,000 ppm or less, about 500 ppm or less, about 250 ppm or less, or about 100 ppm or less based on total chromium oxides in the catalyst composition. In some embodiments the chromium(III) oxide may be present in an amount of about 99 wt % or more, based on total chromium oxides in the catalyst composition.

In some embodiments, the chromium(III) oxide and the chromium(VI) oxide, in total, are present at an amount of about 80 wt % or more, about 85 wt % or more, about 90 wt % or more, about 95 wt % or more, about 96 wt % or more, about 97 wt % or more, about 98 wt % or more, or about 99 wt % or more based on total weight of the chromium oxide catalyst composition.

In some embodiments the chromium oxide catalyst composition may have a BET (Brunauer-Emmett-Teller) surface area of about 50 $m^2/g$ or more, or of about 150 $m^2/g$ or more. The BET surface area may be measured and calculated according to the BET model disclosed in ISO 9277:2010 (described in further detail below). In some embodiments, the BET surface area may range from about 150 $m^2/g$ to about 350 $m^2/g$, from about 200 $m^2/g$ to about 325 $m^2/g$, or from about 300 $m^2/g$. In some embodiments the chromium oxide catalyst composition may have a high pore volume. In some embodiments the chromium oxide catalyst composition may be compressed into various shapes (e. g. to form tablets), pelletized, or processed by extrusion techniques (e. g. to form extrudates).

In some embodiments the invention is directed to a chromium oxide catalyst system comprising a chromium oxide catalyst composition in contact with a substrate. In some embodiments, the catalyst composition and/or the catalyst system may further comprise one or more promoters and/or co-catalysts.

In some embodiments the invention is directed to a method of making a hydrohalocarbon compound, the method comprising: contacting a hydrohalocarbon starting materials with a chromium oxide catalyst composition and/ or with a chromium oxide catalyst system according to an embodiment disclosed herein.

The term "substrate" refers to a material (e.g. a metal, semi-metal, semi-metal oxide or metal oxide) onto or into which the catalyst composition is placed. In some embodiments, the substrate may be in the form of a solid surface having a washcoat containing a plurality of catalytic particles. In some embodiments, the substrate may be in a form of a porous solid surface and the catalyst composition may be impregnated thereon outside the pores and/or inside the pores. Suitable substrate geometries comprise extrudates, spheres, tablets, monoliths, honeycombs, pellets, granulates and powders.

The term "amorphous" refers to the presence of a baseline background signal and the absence of sharp reflections in the diffractogram when a sample is analyzed under x-ray diffraction (XRD)

The term "xerogel" refers to a gel prepared by the sol-gel process and dried under normal conditions, e.g, by evaporation. The normal drying conditions may exert capillary pressure on the gel, thereby shrinking as well as densifying the gel network to form a xerogel.

The terms "chromium(VI) oxide" and "chromic acid" are used interchangeably throughout the application and are also understood to encompass other common names such as "chromium trioxide" and "chromic anhydride".

The term "total chromium oxides content" refers to the sum of all chromium oxide species present and is meant to encompass various oxidation states, including but not limited to, chromium(III) oxide, chromium(VI) oxide, chromium (IV) oxide, and chromium (II) oxide.

The term "catalyst composition" refers to the active component(s) responsible for the catalytic activity.

The term "catalyst system" refers to the catalyst composition as well as any supplemental additive(s) such as substrates, promoters, binders, stabilizers, and so on.

BRIEF DESCRIPTION OF THE DRAWINGS

The above and other features of the present disclosure, their nature, and various advantages will become more apparent upon consideration of the following detailed description, taken in conjunction with the accompanying drawing, in which:

FIG. 1 depicts a schematic of the process for preparing a chromium oxide catalyst composition according to an embodiment.

DETAILED DESCRIPTION

The present disclosure relates to a process for making a chromium oxide catalyst composition with minimal chromium(VI) content. The processes disclosed herein have many advantages, such as: using an organic reducing solvent having a single organic chemical (or in some embodiments two organic chemicals) without additional chemicals or chelating agents; using a sol-gel process; all intermediates encountered at different steps in the processes have minimal chromium(VI) oxide levels thus enabling safe industrial-scale handling, and in some embodiments have chromium (VI) oxide levels that are below the regulated limit.

A Method for Preparing a Chromium Oxide Catalyst Composition and/or System

The present disclosure relates to methods for preparing a chromium oxide catalyst composition and/or system having minimal chromium(VI) oxide levels, and in some embodiments, methods for preparing a chromium oxide catalyst composition and/or system having chromium(VI) oxide levels that are below the regulated limits.

In some embodiments, porous $Cr_2O_3$ powder with reduced levels of chromium(VI) oxide may be prepared by a process known as the "reduction route" or as the "organic route." This process utilizes ethanol and/or other reducing agents to reduce the chromium(VI) oxide to chromium(III) oxide. Illustrative reduction route processes have been discussed in U.S. Pat. No. 2,271,356 (disclosing a gel type $Cr_2O_3$ catalyst prepared by reacting chromium(VI) oxide with various reducing agents (e.g., ethanol and oxalic acid) in aqueous solution) and U.S. Pat. No. 3,258,500 (disclosing a sol-gel process and a pigment drying process for the preparation of a $Cr_2O_3$ catalyst). The processes disclosed in these patents may be further modified, as disclosed herein, to produce a final chromium oxide catalyst composition and/or system having reduced levels of chromium(VI) oxide.

In some embodiments, a catalyst composition may be prepared using a "precipitation route," also known as an "inorganic route." This process utilizes chromium(III) salt precursors (such as nitrate salts, chloride salts, sulfate salts, etc) dissolved in an aqueous solution and treated with a solution, such as ammonia solution, to form a chromium hydroxide precipitate. Under the inorganic route, the chromium hydroxide precipitate may undergo additional treatment steps, such as filtration, drying, calcination and so on to form chromium oxide. Illustrative precipitation route processes for the preparation of chromium oxide have been discussed in U.S. Pat. Nos. 6,300,531, 5,523,500, and 5,155,082 (disclosing an exemplary process of aqueous chromium salt being mixed with aqueous ammonia or alkali metal hydroxide to precipitate chromium hydroxide).

In some embodiments, a catalyst composition may be prepared using a "thermal decomposition" route. This process utilizes chromium precursors (such as ammonium dichromate(VI), sodium dichromate(VI), potassium dichromate(VI), chromic acid, etc.) which upon thermal treatment (usually at elevated temperatures above 400° C.) will form chromium oxide and will release volatile by-products. Depending on the choice of the chromium precursors, the chromium oxide obtained by the "thermal decomposition" route may contain or may not contain e. g. ammonium, sodium or potassium. The level of such compounds may be reduced by a washing step with water or a suitable organic solvent after the thermal decomposition of the chromium precursor has been carried out. Illustrative processes for the preparation of chromium oxide following the "thermal decomposition" route have been discussed in U.S. Pat. No. 5,036,036.

The processes disclosed in these patents may be further modified, as disclosed herein, to produce a final catalyst composition and/or system having reduced levels of chromium(VI) oxide. It is an object of the present invention to encompass chromium(III) oxide catalyst compositions and/or systems prepared by all of the routes disclosed herein.

The various embodiments are now described with reference to the following FIGURES and examples. Before describing several exemplary embodiments, it is to be understood that the present disclosure is not limited to the details of construction or process steps set forth in the following description. Other embodiments may be practiced or carried out in various ways in accordance with the principles described.

FIG. 1 depicts a schematic illustrating an exemplary sol-gel process 100 for preparing a chromium oxide catalyst composition according to an embodiment of the invention. At block 110, the process may comprise: forming a mixture comprising chromium(VI) oxide, an aqueous solvent, and an organic reducing solvent. The mixture may be formed in any conceivable order. In some embodiments, the chromium(VI) oxide may be dissolved in the aqueous solvent to form a solution A first, and thereafter the organic reducing solvent may be added to solution A. In some embodiments, solution A may be added to the organic reducing solvent. In some embodiments, the aqueous solvent and the organic reducing solvents may be mixed or premixed and the chromium(VI) oxide may be added to the mixture of solvents. The addition may be controlled over a predetermined period of time. Alternatively, the addition may be instantaneous.

In some embodiments, the aqueous solvent may be water. In some embodiments, the organic reducing solvent may be an alcohol, an aldehyde, a carboxylic acid, or a combination thereof, for example, methanol, ethanol, propanol, isopropanol, butanol, isobutanol, n-butanol, sec-butanol, tert-butanol, isoprenol, benzyl alcohol, isobutyraldehyde, isobutyric acid, acetic acid, ethanol and acetic acid, ethanol and isobutyric acid, etc. In some embodiments, the aqueous solvent and organic reducing solvent may form a binary phase mixture or a ternary phase mixture depending on the solubility of the solvents in one another. In some embodiments, the addition may lead to an exothermic reaction and increase the temperature of the mixture.

In some embodiments, the molar ratio of the organic reducing solvent to the chromium(VI) oxide may range from about 0.2 to about 4.0, from about 0.3 to about 3.0, from about 0.4 to about 2.0, from about 0.5 to about 1.5, from about 0.6 to about 1.3, from about 0.75 to about 1.5, or from about 1 to about 1.25.

At block 120, the process may further comprise: refluxing the mixture to form a slurry. The refluxing may occur at an elevated temperature ranging from about 50° C. to about 250° C., from about 70° C. to about 150° C., or from about 85° C. to about 95° C. The refluxing may take place over a time period ranging from about 30 minutes to about 24 hours, from about 1 hour to about 20 hours, from about 3 hours to about 16 hours, or for the duration of time necessary to reduce the chromium(VI) oxide content in the resulting slurry below a predetermined level. The predetermined level may be for example about 10,000 ppm or less, about 5,000 ppm or less, about 2,000 ppm or less, about 1,000 ppm or less, about 500 ppm or less, about 250 ppm or less, or about 100 ppm or less of chromium(VI) oxide based on the total chromium oxides content present in the slurry.

The existence of refluxing, its temperature, and duration may be dependent on the aqueous and organic reducing solvent used in the process. In some embodiments, there may be no refluxing whatsoever. In some embodiments, a first reducing organic solvent mixed with solution A may be refluxed for a first duration. The first duration may range from about 30 minutes to about 24 hours, from about 1 hour to about 20 hours, from about 3 hours to about 16 hours, or for the duration of time necessary to reduce the chromium (VI) oxide content in the resulting slurry below a predetermined level. Thereafter, a second reducing organic solvent may be added and subsequently the mixture and/or slurry may be further refluxed for a second duration after the addition of the second reducing organic solvent to reach a desired chromium(VI) oxide level. The second reflux duration and temperature may be equal to, shorter, or longer than the first reflux duration and temperature and may be dependent on the aqueous and organic chemical(s) used in the process.

At block 130 the process may further comprise: reducing the chromium(VI) in the mixture to chromium(III). In some embodiments, the reduction reaction occurs immediately upon formation of the aqueous solvent, organic reducing solvent, and chromium(VI) oxide mixture. In some embodiments, the reduction reaction occurs during refluxing. The reduction may occur during a single refluxing step or during multiple refluxing steps. In some embodiments, the organic reducing solvent acts as both a reducing agent and as a solvent and reduces the chromium(VI) into chromium(III). In some embodiments, the organic reducing solvent gets oxidizes as a consequence of reducing the chromium(VI) into chromium(III). In some embodiments, the mixture and/or the slurry are free of any other additives such as reducing agents or chelating agents and the only components in the mixture and/or slurry are the aqueous solvent, the organic reducing solvent, the chromium(VI) oxide, and any reaction products arising therefrom.

In one embodiment, the aqueous solvent may comprise water and the organic reducing solvent may comprise isobutyl alcohol. The chromium(VI) oxide may be dissolved in water to form a chromium(VI) oxide solution. The isobutyl alcohol may then be added to the chromium(VI) oxide solution to form a binary mixture. The addition of isobutyl alcohol may result in an exothermic reaction, thereby increasing the temperature of the mixture to a range of, e.g., from about 25° C. to about 50° C. External heating may be used to increase the temperature of the mixture to a range of, e.g., from about 85° C. to about 95° C. The temperature may be maintained at the temperature range obtained with external heating and the reaction may then be refluxed for about 3 hours. During the refluxing, several reactions may occur, for example: 1) chromium(VI) may be reduced to chromium(III); 2) isobutyl alcohol may be oxidized to isobutyraldehyde and isobutyric acid; and 3) isobutyric acid may react with the chromium(VI) oxide to form acetone and carbon dioxide. At block 130 a sol-gel slurry may be formed. These reactions, as well as reactions occurring in other embodiments, may achieve a chromium(VI) oxide level that is about 10,000 ppm or less, about 5,000 ppm or less, about 2,000 ppm or less, about 1,000 ppm or less, about 500 ppm or less, about 250 ppm or less, or about 100 ppm or less based on the total chromium oxides content present in the slurry.

The sol-gel slurry may then proceed to block 140, drying the slurry to form a powder having minimal levels of chromium(VI) oxide. When the sol-gel slurry is dried under normal conditions, i.e., where the liquid is evaporated gradually and not at supercritical conditions, a dense xerogel may be formed. The drying may occur at a temperature ranging from about 50° C. to about 200° C., from about 100° C. to about 150° C., or at about 120° C. In some embodiments, the drying may be performed in air. In other embodiments, the drying may be performed under nitrogen. In some embodiments, drying the slurry may form a cake, and the cake may thereafter be granulated to form a dried powder.

The dried powder may optionally be calcined as depicted in block 150. The calcining may occur at a temperature ranging from about 300° C. to about 500° C. or from about 350° C. to about 450° C. In some embodiments, the calcining may be performed in air. In other embodiments, the calcining may be performed under nitrogen. In yet other embodiments the calcination may be performed under steam.

The dried powder, whether calcined or not, may optionally be blended with a lubricant as depicted in block 160. The lubricant may improve the flowability of the resulting catalyst composition. The lubricant may be one or more of graphite, polytetrafluoroethylene (PTFE) or hexagonal boron nitride, molybdenum disulfide, tungsten disulfide, chromium acetate hydrate, or chromium acetate hydroxide. In some embodiments, the lubricant may be graphite with a low percentage of water.

The dried powder, whether calcined or not and whether blended with a lubricant or not, may optionally be compressed into various shapes (e.g., to form tablets), pelletized, or processed by extrusion techniques (e.g., to form extrudates) as depicted in block 170. For example, the compressed, pelletized, or extruded catalyst composition may be shaped as pellets, beads, extrudates, rings, spheres, cylinders, trilobe, and quadralobe shaped pieces.

The dried powder (regardless of whether calcined, blended with a lubricant, compressed or pelletized) may form a final chromium oxide catalyst composition, pursuant to block 180, described in further details below.

The chromium(VI) oxide level in the dried and/or calcined and/or blended and/or compressed and/or pelletized powder and/or extruded and/or final chromium oxide catalyst composition may be about 10,000 ppm or less, about 5,000 ppm or less, about 2,000 ppm or less, about 1,000 ppm or less, about 500 ppm or less, about 250 ppm or less, or about 100 ppm or less based on the total chromium oxides content present in the dried and/or calcined and/or blended and/or compressed and/or pelletized powder and/or extruded and/or final chromium oxide catalyst composition.

The concentration of dissolved chromium(VI) or chromium(VI) oxide may be measured in accordance with publicly available EPA's (Environmental Protection Agency) method 7196A. In method 7196A the concentration of dissolved chromium(VI) is determined colorimetrically by reacting the chromium(VI) with diphenylcarbazide in acid solution. A red-violet color of unknown composition is produced in the reaction. The composition's absorbance may be measured photometrically at 540 nm. Since the reaction could be sensitive, precautions are taken to ensure that the reaction occurs in the absence of interfering amounts of substances such as molybdenum, vanadium, mercury, and iron, which could also react with diphenylcarbazide to form color. Exemplary colorimetric equipment that may be used include: a spectrophotometer, for use at 540 nm, providing a light path of 1 cm or longer; or a filter photometer, providing a light path of 1 cm or longer and equipped with a greenish-yellow filter having maximum transmittance near 540 nm.

The final chromium oxide catalyst composition may also be combined with supplemental additive(s) to form a final chromium oxide catalyst system. For example, the chromium oxide catalyst composition may be disposed onto and/or into a substrate, or the chromium oxide catalyst composition may be combined with one or more of a promoter, binder, co-catalyst, or combinations thereof at various stages of the process.

Chromium Oxide Catalyst Composition

In some embodiments, the invention is directed to a chromium oxide catalyst composition comprising: a chromium(III) oxide and a chromium(VI) oxide, wherein the chromium(VI) oxide may be present at an amount of about 10,000 ppm or less, about 5,000 ppm or less, about 2,000 ppm or less, about 1,000 ppm or less, about 500 ppm or less, about 250 ppm or less, or about 100 ppm or less based on total chromium oxides in the chromium oxide catalyst composition. In some embodiments the chromium(III) oxide may be present in an amount of about 99 wt % or more, based on total chromium oxides in the chromium oxide catalyst composition.

In some embodiments, the chromium(III) oxide and the chromium(VI) oxide, in total, are present in the catalyst composition at an amount of about 80 wt % or more, about 85 wt % or more, about 90 wt % or more, about 95 wt % or more, about 96 wt % or more, about 97 wt % or more, about 98 wt % or more, or about 99 wt % or more based on total weight of the chromium oxide catalyst composition.

In some embodiments, the chromium oxide catalyst composition, may be an amorphous gel, such as xerogel. In some embodiments, the amorphous gel may be about 80% or more, about 85% or more, about 90% or more, about 95% or more, about 98% or more, about 99% or more, or about 100% amorphous. Amorphous contents disclosed herein may be measured using an PANalytical X'Pert Pro XRD instrument. The instrument is calibrated with 100% NBS (Nation Bureau of Standards) standard. All samples were scanned between two theta angles ranging from about 32.5° to about 34.5°, ensuring that the scan encompassed major peaks of $\alpha$-$Cr_2O_3$ (d-2.665) which are typically present at a two theta angle of about 33.6°. The amorphous content determination is performed using Rietveld analysis.

In some embodiments the chromium oxide catalyst composition may have a high BET surface area of about 150 $m^2/g$ or more. In some embodiments, the BET surface area of the chromium oxide catalyst composition may range from about 150 $m^2/g$ to about 350 $m^2/g$, from about 200 $m^2/g$ to about 325 $m^2/g$, from about 240 $m^2/g$ to about 325 $m^2/g$, or about 300 $m^2/g$. BET surface areas disclosed herein may be measured using two Micromeritics instruments, namely: Gemini VNII surface area analyzers, and TriStar II plus. The ISO (International Organization of Standardization) test method on both instruments is 9277:2010, entitled "determination of the specific area of solids by gas adsorption—BET method."

The chromium oxide catalyst composition may have a median bulk density ranging from about 0.3 g/cc to about 1.0 g/cc, from about 0.4 g/cc to about 0.9 g/cc, or from about 0.45 g/cc to about 0.8 g/cc. Bulk densities disclosed herein may be measured using the American Society for Testing Materials (ASTM) D7481-09 method, entitled "standard test method for determining loose and tapped bulk density of powders using graduated cycliner," and is analyzed on a Scott paint volumeter (densitometer) instrument.

The chromium oxide catalyst composition may be porous with pore volumes ranging from about 0.2 cc/g to about 2.0 cc/g, from about 0.4 cc/g to about 1.5 cc/g, or from about 0.4 cc/g to about 1.2 cc/g. Pore volumes disclosed herein may be measured by two methods, namely, the mercury (Hg) method and the nitrogen ($N_2$) method. The Hg method utilizes the ASTM D4284-12 method, entitled "standard test method for determining pore volume distribution of catalyst and catalyst carriers by mercury intrusion porosimetry," and is analyzed on a Micromeritics AutoPore V instrument. The $N_2$ method utilizes the ASTM D4222-03(2008) method, entitled "standard test method for determining of nitrogen adsorption and desorption isotherms of catalyst and catalyst carriers by static volumetric measurements," and is analyzed on a Micromeritics TriStar II Plus instrument.

In some embodiments the chromium oxide catalyst composition may comprise various shapes, such as tablets, pellets, beads, extrudates, rings, spheres, cylinders, stars, hollow stars, trilobe, hollow trilobe, a quadralobe and hollow quadrolobe shaped pieces.

Chromium Oxide Catalyst System

In some embodiments the invention is directed to a chromium oxide catalyst system comprising a chromium oxide catalyst composition in contact with a substrate, such as alumina ($Al_2O_3$), aluminum fluoride ($AlF_3$), fluorinated alumina, silica ($SiO_2$), zirconia ($ZrO_2$), titania ($TiO_2$), magnesium oxide (MgO), magnesium fluoride ($MgF_2$), calcium fluoride ($CaF_2$), carbon materials (such as activated carbon, charcoal, or carbon black), or combinations thereof. The substrate may be present in the chromium oxide catalyst system in an amount of up to about 95 wt % based on the total weight of the chromium oxide catalyst system.

In some embodiments, the chromium oxide catalyst system may further comprise one or more co-catalysts and/or promoters, for example lithium (Li), sodium (Na), potassium (K), rubidium (Rb), cesium (Cs), beryllium (Be), magnesium (Mg), calcium (Ca), strontium (Sr), barium (Ba), scandium (Sc), yttrium (Y), zirconium (Zr), hafnium (Hf), vanadium (V), niobium (Nb), tantalum (Ta), tungsten (W), manganese (Mn), rhenium (Re), iron (Fe), ruthenium (Ru), osmium (Os), cobalt (Co), rhodium (Rh), iridium (Ir), zinc (Zn), nickel (Ni), palladium (Pd), platinum (Pt), copper (Cu), silver (Ag), gold (Au), cadmium (Cd), mercury (Hg), boron (B), aluminum (Al), gallium (Ga), indium (In), thallium (Tl), silicon (Si), phosphorus (P), arsenic (As), bismuth (Bi), selenium (Se), tellurtum (Te), thorium (Th), uranium (U), titanium (Ti), molybdenum (Mo), lead (Pb), tin (Sn), germanium (Ge), antimony (Sb), a compound based on an element from the lanthanide series (rare earth elements), or combinations thereof.

Suitable compounds of co-catalysts and/or promoters comprise halides, oxides, oxyhalides, or mixtures thereof. Promoters and/or co-catalysts may also be present in their elemental state, e.g., in their metallic or semi-metallic form. The co-catalyst and/or promoters may be part of the chromium oxide catalyst composition and may be in contact with the substrate. Processes known in the art, such as impregnation, co-precipitation, or powder mixing may be applied to include promoters and/or co-catalysts in the catalyst system. The chromium oxide catalyst system preparation may be assisted by the addition of a process solvent such as e. g. water, organic solvents, dilute acids (e. g. nitric acid), dilute bases (e. g. ammonia) or mixtures thereof. The promoters and/or co-catalysts may be present in the chromium oxide catalyst system in an amount ranging from about 0.5 wt % to about 30 wt % based on the total weight of the chromium oxide catalyst system.

Method of Making Hydrohalocarbons

Historically, ammonia was used in refrigeration. Its high toxicity and fatal consequences resulting from ammonia leaks led to the development of chlorofluorocarbons (CFCs) and fluorocarbons (FCs). CFCs are synthetic compounds, composed of the elements chlorine, fluorine, and carbon, that have been developed primarily for refrigerant applications. These compounds were deemed particularly suitable as refrigerants due to their inert, nontoxic, and easily compressible nature. FCs are synthetic compounds, composed of the elements fluorine and carbon only.

It was later discovered that CFCs are harmful to the environment. Once CFCs are released into the air, they slowly drift upward in the atmosphere and remain unreacted for long periods of times until they reach the stratosphere where they get exposed to ultraviolet light from the sun, which in turn activates the CFCs and breaks their carbon-chloride bond, thereby releasing chlorine atoms. The chlorine atoms react with the ozone in the stratosphere, which hinders the ozone-oxygen equilibrium in the stratosphere and contributes to the destruction of the stratospheric (high altitude) ozone, also known as "ozone layer."

As a result, future production and use of CFCs were greatly limited and in some instances banned. CFC production has been totally phased out by the end of the twentieth century. Hydroflurocarbons (HFCs) and hydrochlorofluorocarbons (HCFCs), also known as third generation halocarbons, were introduced as a CFC replacement in the refrigeration industry. HFCs are composed of hydrogen and fluorine bound to carbon atoms and HCFCs are composed of hydrogen, fluorine, and chlorine atoms bound to carbon atoms. The presence of hydrogen-carbon bonds makes HFCs and HCFCs more reactive than CFCs and thus more susceptible to environmental degradation. Thus, HFCs and HCFCs get destroyed at lower altitudes without reaching and harming the stratosphere. At the same time, the presence of a hydrogen atom reduced the boiling point of HFCs and HCFCs, resulting in inferior refrigeration efficiency as compared to HFCs. Additionally, while HFCs and HCFCs do not reach the stratosphere, they have been identified as potent greenhouse gases contributing to the acceleration of global warming as a result of their increasing concentration in the lower atmosphere.

Therefore, recent efforts to phase out HFCs and HCFCs were undertaken with the goal to develop a fourth generation of hydrohalocarbons such as hydrofluoroolefins (HFOs), hydrochlorofluoroolefins (HCFOs) and hydrocarbons (HCs). HFOs are unsaturated HFCs, composed of hydrogen and fluorine bound to carbon atoms, but contain at least one double bond between the carbon atoms. HCFOs are unsaturated HCFCs, composed of hydrogen, chlorine and fluorine bound to carbon atoms, but contain at least one double bond between the carbon atoms. HCs, also referred to as "natural refrigerants" as they are created by nature, are composed of hydrogen and carbon only. HFOs and HCs are considered environmentally friendly due to their low impact on greenhouse gases, minimal global warming potential, low ozone depletion potential, cost efficiency, and energy efficiency. Exemplary HFOs that are being developed on a global scale for various applications such as e. g. refrigeration (including mobile and stationary applications, chilling and air-conditioning) and foam blowing include 2,3,3,3-tetrafluoro-1-propene (HFO-1234yf), trans-1,3,3,3-tetrafluoro-1-propene (HFO-1234ze(E)), cis-1,3,3,3-tetrafluoro-1-propene (HFO-1234ze(Z)), trans-1-chloro-3,3,3-trifluoropropene (HCFO-1233zd(E)), cis-1-chloro-3,3,3-trifluoropropene (HCFO-1233zd(Z)), 3,3,3-trifluoropropene (HFO-1243zf), 1-chloro-2,3,3,3-tetrafluoropropene (HFO-1224yd) and 1,1,1,4,4,4-hexafluoro-2-butene (HFO-1336mz) and their constitutional (structural) isomers and stereoisomers (spatial isomers). All these compounds have a negligible ozone depletion potential and extremely low global warming potentials. HFO-1234yf has been used in vehicles (in Europe in 2011 model-year cars and in the United States in 2013 model-year cars). HFO-1234ze(E) is intended to be used in e.g., residential, light commercial air conditioning and heat pump applications, vending machines, fridges, beverage dispensers, air dryers, carbon dioxide cascade systems in commercial refrigeration, and so on.

HCs are currently being used in Europe as stand-alone refrigerants applications such as refrigerators, bottle coolers, split air conditioning units, domestic refrigerators, freezers, and so on. In the United States, the use of HCs is somewhat more limited due to their high flammability.

In general, also blend systems containing two or more hydrohalocarbons selected from the group of CFCs, FCs, HCFCs, HFOs, HCFOs and HCs may be applied to the applications mentioned above. In such blends, hydrohalocarbons may be selected from the same or from different of the above groups. For example, R404A is a commercial blend containing HFC-125, HFC-143a and HFC-134a in a ratio of 44%/52%/4%, R407C is a commercial blend containing HFC-32, HFC-125 and HFC-134a in a ratio of 23%/25%/52% and R410A is a commercial blend containing HFC-32 and HFC-125 in a ratio of 50%/50%.

In some embodiments the invention is directed to a method of making a hydrohalocarbon comprising: contacting a hydrohalocarbon starting materials with a chromium oxide catalyst composition or a chromium oxide catalyst system according to an embodiment. Such method may be carried out using a fixed-bed, moving-bed, fluidized-bed or slurry-bed reactor design applying gas-phase, vapor-phase, liquid-phase, slurry phase or mixed gas/liquid reactor operation conditions. Such method may be carried out in a continuous manner or in a batch-type manner. There are many known methods to introduce fluorine into organic compounds, but hydrogen fluoride (HF) is considered to be the most economical source of fluorine for many commercial applications. Halogen exchange reactions (e. g. exchanging chlorine atom(s) for fluorine atom(s)), hydrogen replacement reactions (e. g. exchanging hydrogen atom(s) for fluorine atom(s)) and the addition of hydrogen fluoride (hydrofluorination) to non-saturated carbon-carbon bonds (including double-bonds and triple-bonds) are the most frequently employed methods. Suitable methods are further described in Kirk-Othmer Encyclopedia of Chemical Technology, Volume 11, pages 858 to 876, Organic Fluorine Compounds (Author William X. Bajzer) which is herein incorporated by reference.

In some embodiments, suitable methods of making such hydrohalocarbon compounds comprise hydrofluorination reactions in the presence of hydrogen fluoride (HF). In general such methods also comprise dehydrofluorination reactions in which hydrogen fluoride (HF) is released and non-saturated carbon-carbon bonds are formed.

Hydrohalocarbon compounds prepared by the method are for example useful as refrigerants (including mobile and stationary applications for refrigeration, chilling and air-conditioning), foam blowing agents, aerosol propellants, solvents, electronic gases, fire extinguishing agents as well as fluoropolymer, fluoroelastomer, chlorofluoropolymer and chlorofluoroelastomer precursors.

The chromium oxide catalyst composition or chromium oxide catalyst system may also be present in its activated (or regenerated) form prior to its contact with hydrohalocarbon starting materials. During activation (or regeneration) the chromium oxide may be fully or partially converted to a corresponding chromium oxyhalide, a chromium halide, or mixtures thereof. When the chromium oxide catalyst composition is present as a chromium oxyhalide corresponding to the general empirical formula $Cr_xO_yHal_z$, where x is 1-2 and y and z are selected such that the valency of chromium (Cr) is satisfied. The valency of chromium is typically 3-6.

Possible halides (Hal) are chlorides and fluorides. Thus, illustrative activated (or regenerated) forms of chromium may include one or more of oxychlorides, chlorides, chlorofluorides, oxychlorofluorides, oxyfluorides or fluorides of chromium. Activation (or regeneration) can be for example performed by treating the chromium oxide catalyst composition with anhydrous hydrogen fluoride (HF), optionally in the presence of oxygen.

Chromium oxide catalyst compositions or catalyst systems for which the activity has fallen as a consequence of contamination may also be regenerated by cleaning the catalyst composition's or system's surface with a compound capable of oxidizing and converting the products (organic products, coke, and the like) deposited on the surface into volatile products. In this case, oxygen or a mixture containing oxygen (e. g. air) is suitable and enables the catalyst activity to be restored.

In some embodiments, the hydrohalocarbon prepared by methods disclosed herein may include one or more of trichlorofluoromethane (CFC-11), dichlorodifluoromethane (CFC-12), chlorotrifluoromethane (CFC-13), tetrafluoromethane (FC-14), dichlorofluoromethane (HCFC-21), chlorodifluoromethane (HCFC-22), trifluoromethane (HFC-23), chlorofluoromethane (HCFC-31), difluoromethane (HFC-32), perfluorohexane (FC-51-14), pentachlorofluoroethane (CFC-111), 1,1,2,2-tetrachloro-1,2-difluoroethane (CFC-112), 1,1,1,2-tetrachloro-2,2-difluoroethane (CFC-112a), 1,1,2-trichloro-1,2,2-trifluoroethane (CFC-113), 1,1,1-trichloro-2,2,2-trifluoroethane (CFC-113a) 1,2-dichlorotetrafluoroethane (CFC-114), 1,1-dichlorotetrafluoroethane (CFC-114a), chloropentafluoroethane (CFC-115), hexafluoroethane (FC-116), 1,1,2,2-tetrachloro-1-fluoroethane (HCFC-121), 1,1,1,2-tetrachloro-2-fluoroethane (HCFC-121a), 1,1,2-trichloro-2,2-difluoroethane (HCFC-122), 1,1,2-trichloro-1,2-difluoroethane (HCFC-122a), 1,1,1-trichloro-2,2-difluoroethane (HCFC-122b), 2,2-dichloro-1,1,1-trifluoroethane (HCFC-123), 1,2-dichloro-1,1,2-trifluoroethane (HCFC-123a), 1,1-dichloro-1,2,2-trifluoroethane (HCFC-123b), 2-chloro-1,1,1,2-tetrafluoroethane (HCFC-124), 1-chloro-1,1,2,2-tetrafluoroethane (HCFC-124a), pentafluoroethane (HFC-125), 1,1,2-trichloro-2-fluoroethane (HCFC-131), 1,1,2-trichloro-1-fluoroethane (HCFC-131a), 1,1,1-trichloro-2-fluoroethane (HCFC-131b), dichlorodifluoroethane (HCFC-132), 1,1-dichloro-2,2-difluoroethane (HCFC-132a), 1,2-dichloro-1,1-difluoroethane (HCFC-132b), 1,1-dichloro-1,2-difluoroethane (HCFC-132c), 2-chloro-1,1,1-trifluoroethane (HCFC-133), 2-chloro-1,1,1-trifluoroethane (HCFC-133a), 1-chloro-1,1,2-trifluoroethane (HCFC-133b), 1,1,2,2-tetrafluoroethane (HFC-134), 1,1,1,2-tetrafluoroethane (HFC-134a), 1,2-dichloro-1-fluoroethane (HCFC-141), 1,1-dichloro-2-fluoroethane (HCFC-141a), 1,1-dichloro-1-fluoroethane (HCFC-141 b), 1-chloro-1,2-difluoroethane (HCFC-141a), chloro difluoroethane (HCFC-142), 1-chloro-1,2-difluoroethane (HCFC-142a), 1-chloro-1,1-difluoroethane (HCFC-142b), 1,1,2-trifluoroethane (HFC-143), 1,1,1-trifluoroethane (HFC-143a), chlorofluoroethane (HCFC-151), 1,2-difluoroethane (HFC-152), 1,1-difluoroethane (HFC-152a), fluoroethane (HFC-161), 1,1,1,2,2,3,3-heptachloro-3-fluoropropane (CFC-211), 1,1,1,3,3,3-hexachloro-2,2-difluoropropane (CFC-212), 1,1,1,3,3-pentachloro-2,2,3-trifluoropropane (CFC-213), 1,1,1,3-tetrachloro-2,2,3,3-tetrafluoropropane (CFC-214), 1,2,2-trichloropentafluoropropane (CFC-215aa), 1,1,2-trichloropentafluoropropane (CFC-215bb), 1,2-dichloro-1,1,2,3,3,3-hexafluoropropane (CFC-216), 1-chloro-1,1,2,2,3,3,3-heptafluoropropane (CFC-217), octafluoropropane (FC-218), hexachlorofluoropropane (HCFC-221), pentachlorodifluoropropane (HCFC-222), tetrachlorotrifluoropropane (HCFC-223), trichlorotetrafluoropropane (HCFC-224), 3,3-dichloro-1,1,1,2,2-pentafluoropropane (HCFC-225ca), 1,3-dichloro-1,1,2,2,3-pentafluoropropane (HCFC-225cb), 1-chloro-1,1,2,2,3,3-hexafluoropropane (HCFC-226), 1,1,1,2,3,3,3-heptafluoropropane (HFC-227ea), pentachlorofluoropropane (HFC-231), tetrachlorodifluoropropane (HCFC-232), trichlorotrifluoropropane (HCFC-233), dichlorotetrafluoropropane (HCFC-234), chloropentafluoropropane (HCFC-235), 1,1,1,2,2,3-hexafluoropropane (HFC-236cb), 1,1,1,2,3,3-hexafluoropropane (HFC-236ea), 1,1,1,3,3,3-hexafluoropropane (HFC-236fa), tetrachlorofluoropropane (HCFC-241), trichlorodifluoropropane (HCFC-242), dichlorotrifluoropropane (HCFC-243), 1,3-dichloro-1,2,2-trifluoropropane (HCFC-243ca), 1,1-dichloro-2,2,3-trifluoropropane (HCFC-243cb), 1,1-dichloro-1,2,2-trifluoropropane (HCFC-243cc), 2,3-dichloro-1,1,1-trifluoropropane (HCFC-243da), 1,3-dichloro-1,2,3-trifluoropropane (HCFC-243ea), 1,3-dichloro-1,1,2-trifluoropropane (HCFC-243ec), 2,3-dichloro-1,1,1-trifluoropropane (HCFC-243db), chlorotetrafluoropropane (HCFC-244), 2-chloro-1,2,3,3-tetrafluoropropane (HCFC-244ba), 2-chloro-1,1,1,2-tetrafluoropropane (HCFC-244bb), 3-chloro-1,1,2,2-tetrafluoropropane (HCFC-244ca), 1-chloro-1,2,2,3-tetrafluoropropane (HCFC-244cb), 1-chloro-1,1,2,2-tetrafluoropropane (HCFC-244cc), 2-chloro-1,1,3,3-tetrafluoropropane (HCFC-244da), 2-chloro-1,1,1,3-tetrafluoropropane (HCFC-244db), 3-chloro-1,1,2,3-tetrafluoropropane (HCFC-244ea), 3-chloro-1,1,1,2-tetrafluoropropane (HCFC-244eb), 1-chloro-1,1,2,3-tetrafluoropropane (HCFC-244ec), 3-chloro-1,1,1,3-tetrafluoropropane (HCFC-244fa), 1-chloro-1,1,3,3-tetrafluoropropane (HCFC-244fb), 1,2,3,3,3-pentafluoropropane (HFC-245ca), 1,1,1,3,3-pentafluoropropane (HFC-245fa), 1,1,1,2,3-pentafluoropropane (HFC-245 eb), 1,1,1,2,2-pentafluoropropane (HFC-245cb), 1,1,2,3,3-pentafluoropropane (HFC-245ea), 1,1,1,2,3-pentafluoropropane (HFC-245eb), 1,1,1,3,3-pentafluoropropane (HFC-245fa), trichlorofluoropropane (HCFC-251), dichlorodifluoropropane (HCFC-252), chlorotrifluoropropane (HCFC-253), 2-chloro-1,2,3-trifluoropropane (HCFC-253ba), 2-chloro-1,1,2-trifluoropropane (HCFC-253bb), 1-chloro-2,2,3-trifluoropropane (HCFC-253ca), 1-chloro-1,2,2-trifluoropropane (HCFC-253cb), 3-chloro-1,1,2-trifluoropropane (HCFC-253ea), 1-chloro-1,2,3-trifluoropropane (HCFC-253 eb), 1-chloro-1,1,2-trifluoropropane (HCFC-253ec), 3-chloro-1,3,3-trifluoropropane (HCFC-253fa), 3-chloro-1,1,1-trifluoropropane (HCFC-253fb), 1-chloro-1,1,3-trifluoropropane (HCFC-253fc), 1,1,2,2-tetrafluoropropane (HFC-254cb), dichlorofluoropropane (HCFC-261), 1,2-dichloro-2-fluoropropane (HCFC-261ba), chlorodifluoropropane (HCFC-262), 1-chloro-2,2-difluoropropane (HCFC-262ca), 3-chloro-1,1-difluoropropane (HCFC-262fa), 1-chloro-1,3-difluoropropane (HCFC-262fb), chlorofluoropropane (HCFC-271), 2-chloro-2-fluoropropane (HCFC-271b), 2-chloro-1-fluoropropane (HCFC-271d), 1-chloro-1-fluoropropane (HCFC-271fb), octafluorocyclobutane, 1,1,1,4,4,4-hexafluorobutane (HFC-365mfc), decafluoropentane (HFC-4310mee), 2,3,3,3-tetrafluoro-1-propene (HFO-1234yf), trans-1,3,3,3-tetrafluoro-1-propene (HFO-1234ze(E)), cis-1,3,3,3-tetrafluoro-1-propene (HFO-1234ze(Z)), trans-1-chloro-3,3,3-trifluoropropene (HCFO-1233zd(E)), cis-1-chloro-3,3,3-trifluoropropene (HCFO-1233zd(Z)), 3-chloro-2,3,3-trifluoropropene (HCFO-1233yf), 2-chloro-3,3,3- trifluoropropene (HCFO-1233xf), trans-1-chloro-3,3,3-trifluoropropene (HCFO-1233zd(E)), cis-1-chloro-3,3,3-trifluoropropene (HCFO-1233zd(Z)), 3,3,3-trifluoropropene (HFO-1243zf), 1,1,1,4,4,4-hexafluoro-2-butene (HFO-1336mz), 1-chloro-2,3,3,3-tetrafluoropropene (HFO-1224yd), 1-chloro-1,3,3,3-tetrafluoropropene (HCFO-1224zb), 1,1,2-trichloro-3-fluoropropene (HCFO-1231xa), 2,3,3-trichloro-3-fluoropropene (HCFO-1231xf), 2,3-dichloro-3,3-difluoropropene (HCFO-1232xf), trans-1,2,3,3,3-pentafluoropropene (HFO-1225ye(E)), cis-1,2,3,3,3-pentafluoropropene (HFO-1225ye(Z)), 1,1,3,3,3-pentafluoropropene (HFO-1225zc), 1,1-dichloro-3,3,3-trifluoropropene (HCFO-1223za), 1,1,2-trichloro-3,3,3-trifluoropropene (HCFO-1213xa) and their constitutional (structural) isomers and stereoisomers (spatial isomers).

EXAMPLES

The following examples are set forth to assist in understanding the embodiments described herein and should not be construed as specifically limiting the embodiments described and claimed herein. Such variations, including the substitution of all equivalents now known or later developed, which would be within the purview of those skilled in the art, and changes in formulation or minor changes in experimental design, are to be considered to fall within the scope of the embodiments incorporated herein.

Unless specified otherwise, the chromium(VI) oxide contents summarized in the examples were measured using EPA method 7196A which was described in further detail hereinbefore. The detection limit for EPA method 7196A is 0.5 ppm of Cr(VI).

Example 1—Isobutyl Alcohol (IBA) Process

A one liter 4-neck flask equipped with agitator, reflux condenser, coolant chiller and heater, heater controller, temperature probe and recorder, dropping funnel, distillate receiver with ice bath, and nitrogen purge line, etc. was used for lab experiment runs. Raw material recipes were 65 g of $CrO_3$ and 48 g of IBA (99%). 688 g DI-water was charged into the flask first, then chromium(VI) oxide was dissolved in water. Alcohol was pumped into the chromium(VI) oxide solution within 60 minutes at a controlled pump rate. The mixture was heated to 85-95° C. and a binary azeotropic phase was formed. Reflux started and held for 16 hours. A total of 400 g azeotropic mixture was stripped off at the end of reflux cycle. The slurry was unloaded into a glass tray and dried overnight at 120° C. under air. The dried cake was granulated into a powder form. The dried powder was calcined at about 300° C. to 500° C. for 12 hours under nitrogen.

Effects of organic reducing solvents on chromium(VI) reduction are summarized in Table 1 below:

TABLE 1

| Effects of organic solvents on Cr(VI) | |
|---|---|
| | Sample 1 |
| Organic Solvent | Isobutyl Alcohol |
| Organic Solvent/$CrO_3$ molar ratio | 1.0 |
| Dried powder- Cr(VI) oxide | 120 ppm |

Table 1 data demonstrates the effectiveness of the isobutyl alcohol process at Cr(VI) to Cr(III) oxide reduction.

Example 2—Isobutyl Alcohol Consumption During Reflux

Table 2 below summarizes the isobutyl alcohol concentration changes and consumption throughout the reflux cycle. The solids and supernatants were separated by centrifuge at 25° C. Liquid samples were analyzed by GC (Gas Chromatography) and normalized to wt %. The data illustrates that only about 52% of the initially charged isobutyl alcohol was consumed.

TABLE 2

| IBA wt % change during reflux cycle | | |
|---|---|---|
| Reflux Time Point (Hours) | IBA (wt %) | IBA consumption (%) |
| Raw material charge | 6.5 | 0 |
| End of 16 hrs reflux | 3.2 | 51 |

Example 3—Chromium(VI) Reduction in the Isobutyl Alcohol Process of Example 1 and 2

Table 3 below illustrates the chromium(VI) oxide level during various time points in parts of the reflux cycle.

TABLE 3

| Effects of reflux cycle time on Cr(VI) oxide content in the isobutyl alcohol process | | |
|---|---|---|
| Reflux Time Point (Hours) | Cr(VI) oxide (wt %) | Cr(VI) oxide (ppm) |
| 0 | 100 | 1,000,000 |
| 3 | 0.417 | 4,170 |
| 6 | 0.327 | 3,270 |

Table 3 illustrates that the rate of chromium(VI) oxide reduction in the IBA process was intensive within the first 3 hours of the refluxing cycle. Reflux cycle extension beyond the first 3 hours continued the chromium(VI) reduction, but at a slower rate.

The chromium(VI) oxide content depicted in Table 3 was obtained using a wet chemistry titration method, entitled "an oxidation-reduction titration method to determine hexavalent chromium content in chromium product and precursor." The testing procedure included: 1) digesting the solid sample with nitric acid at a controlled temperature for a controlled duration; 2) diluting the acid digested solid in a solvent; 3) adding a buffer solution comprising a combination of potassium hydroxide, acetic acid, and potassium iodide; 4) titrating with sodium thiosulfate; 5) adding a starch indicator solution; and 6) continuing to titrate until the blue color disappears. This titration method has a detection limit of 1000 ppm of Cr(VI).

Example 4—Cr(VI) Reduction with a Single Organic Reducing Solvent

The following reactor set-up and general recipe were used for Examples 5-10 below. Specific alterations will be detailed in the corresponding example.

Reactor System Set-Up

A one liter 4-neck flask equipped with agitator, reflux condenser, coolant chiller, reactor heater, heater controller, temperature probe and recorder, dropping funnel, distillate receiver with ice bath, and nitrogen purge line, etc. was used for lab experiment runs.

Recipe
1) Charge 688 g of DI-$H_2O$ into reactor;
2) Charge X g of chromic acid into reactor, mix for 5-10 minutes with a fixed rate of agitation for a complete solid dissolution with a uniform color;
3) Pump Y g of organic chemical within 20 to 120 minutes under constant agitation;
4) Heat the mixture inside reactor to a reflux point of a binary azeotropic phase;
5) Keep refluxing within the reactor system for a cycle time of 12-16 hours;
6) Strip off 400-415 g of a mixture of organic chemicals and water;
7) Unload the slurry into a dryer for overnight drying at 120-150° C.; and
8) Calcine the dried powder under nitrogen at 300-500° C. overnight.

Example 5—Isopropanol to Chromium(VI) Oxide Optimal Molar Ratio Determination The reactor set-up and recipe of Example 4 were used herein. X g of chromic acid ($CrO_3$) and Y g of isopropanol are depicted in the table below. The chromium(VI) oxide content, surface area, and density values illustrated in the table were measured from dried chromium(III) oxide powder (i.e. powder that was not calcined).

TABLE 4

| isopropanol/$CrCO_3$ molar ratio effect on Cr(VI) levels | | |
|---|---|---|
| Sample | #2 | #3 |
| X = $CrO_3$ g | 65 | 60 |
| Y = Isopropanol, g | 40 | 108 |
| Y/X molar ratio | 1.0 | 3.0 |
| Reflux temperature, ° C. | 89 | 84 |
| Cr(VI) oxide, wt % | 30.4 | 23.4 |
| (ppm) | (304,000) | (234,000) |
| BET surface area, $m^2/g$ | 159 | 216 |
| Density, g/cc | 0.48 | 0.76 |

A higher Isopropanol/$CrO_3$ molar ratio improves the Cr(VI) oxide reduction. An increase in molar ratio from 1 to 3, improves the Cr(VI) oxide reduction by about 23%.

Example 6—the Unique Physical Properties of the Resulting Chromium Oxide Catalyst In addition to a low Cr(VI) level, the IBA process of Example 1 also produced a high surface area of both dried and calcined powders. This could be assumed to provide more active surface sites for catalyst performance improvement. Pore volume measured by $N_2$ and Hg methods shows that chromium(III) oxide powder obtained in the IBA process is also depicted in Table 5. The effects of various organic solvents, e.g., isopropanol and isobutyl alcohol, on the chromium(VI) oxide content and on the BET surface area of various intermediates, pore volumes of calcined powder are summarized in Table 5 below.

TABLE 5

| Effects of organic solvents on Cr(VI) oxide levels, BET surface area and Pore Volume | | | |
|---|---|---|---|
| | Organic Solvent | Isopropanol (Example 5) | Isobutyl Alcohol (Example 1) |
| Dried Powder | Cr(VI) oxide (ppm) | 304,000 | 120 |
| | Surface Area ($m^2/g$) | 159 | 324 |
| Calcined Powder | Cr(VI) oxide (ppm) | N/A | 180 |
| | Surface Area ($m^2/g$) | N/A | 300 |
| | $N_2$ Pore volume (cc/g) | N/A | 0.46 |
| | Hg pore volume (cc/g) | N/A | 0.99 |

Example 7—Cr(VI) Oxide Reduction Using C3-C7 Alcohol

The reactor system set-up and recipe of Example 4 were used herein. X g of chromic acid ($CrO_3$) and Y g of organic chemical (also organic reducing solvent) are depicted in the table below. The chromium(VI) oxide content, surface area and density values illustrated in the table were measured from dried chromium(VI) oxide powder (i.e. powder that was not calcined).

TABLE 6

| Cr(VI) oxide reduction using C2-C7 alcohols | | | | |
|---|---|---|---|---|
| Sample | #2 | #1 | #4 | #5 |
| Alcohol | Isopropanol | Isobutyl alcohol | Isoprenol | Benzyl alcohol |
| (Boiling Point, ° C.) | (82.6) | (108) | (131.2) | (205.3) |
| X = $CrO_3$ g | 65 | 65 | 65 | 65 |
| Y = organic solvent, g | 40 | 48 | 57.3 | 70 |
| Y/X molar ratio | 1.0 | 1.0 | 1.0 | 1.0 |
| Reflux temperature, ° C. | 89 | 92 | 92 | 98 |
| Cr(VI) oxide, wt % | 30.4 | 0.0120 | 1.25 | 0.0120 |
| (ppm) | (304,000) | (120) | (12,500) | (120) |
| BET surface area, $m^2/g$ | 159 | 324 | 184 | 198 |
| Density, g/cc | 0.48 | 0.57 | 0.52 | 0.60 |

The isobutyl alcohol example resulted in a chromium(VI) oxide content of 120 ppm and a high BET surface area of 324 m²/g. The Benzyl alcohol example resulted in a chromium(VI) oxide content of 120 ppm and a slightly lower BET surface area of 198 m²/g.

Example 8—Cr(VI) Reduction Using C4 Alcohols-Butyl Alcohol Isomers

The reactor system set-up and recipe of Example 4 were used herein. X g of chromic acid ($CrO_3$) and Y g of the various butyl alcohol isomers are depicted in the table below.

The chromium(VI) oxide content, surface area and density values illustrated in the table were measured from dried chromium(VI) oxide powder (i.e. powder that was not calcined).

TABLE 7 effect of butyl alcohol isomers on Cr(VI) levels

| Sample | #6 | #7 | #1 (from Example 1) | #8 |
|---|---|---|---|---|
| Butanol Isomer (Boiling Point, ° C.) | n-butyl alcohol (117.4) | Sec-butyl alcohol (99) | Isobutyl alcohol (108) | Tert-butyl alcohol (82.2) |
| X = $CrO_3$ g | 65 | 65 | 65 | 65 |
| Y = Butanol, g | 48 | 48 | 48 | 48 |
| Y/X molar ratio | 1.0 | 1.0 | 1.0 | 1.0 |
| Reflux temperature, ° C. | 93 | 86 | 92 | 93 |
| Cr(VI) oxide, wt % (ppm) | 0.58 (5800) | 27.6 (276,000) | 0.0120 (120) | 89.2 (892,000) |
| BET surface area, m²/g | 190 | 224 | 324 | N/A |
| Density, g/cc | 0.51 | 0.52 | 0.57 | N/A |

Isobutyl alcohol outperformed the other butyl alcohol isomers with respect to the resulting low chromium(VI) oxide content (120 ppm), high BET surface area (324 m²/g) and median density (0.57 g/cc). n-butyl alcohol followed with a low chromium(VI) oxide content (5800 ppm), somewhat high BET surface area (190 m²/g) and median density (0.51 g/cc).

Example 9—Cr(VI) Reduction Using Different Isobutyl Alcohol/$CrO_3$ Molar Ratios The reactor set-up and recipe of Example 4 were used herein. X g of chromic acid ($CrO_3$) and Y g of isobutyl alcohol as depicted in the table below. The chromium(VI) oxide content, surface area and density values illustrated in the table were measured from dried chromium(VI) oxide powder (i.e. powder that was not calcined).

TABLE 8 isobutyl alcohol/$CrO_3$ molar ratio effect on Cr(VI) levels

| Sample | #9 | #10 | #11 | #12 |
|---|---|---|---|---|
| X = $CrO_3$ g | 55 | 55 | 55 | 55 |
| Y = Isobutyl Alcohol, g | 30 | 40 | 45 | 62 |
| Y/X molar ratio | 0.74 | 0.98 | 1.1 | 1.51 |
| Cr(VI) oxide, ppm | 200 | 170 | 2,310 | 5,000 |
| BET surface area, m²/g | 273 | 286 | 252 | 323 |
| Density, g/cc | 0.49 | 0.49 | 0.46 | 0.52 |

There is an optimal window of isobutyl alcohol/$CrO_3$ molar ratio that will result in the lowest $CrO_3$ content and highest BET surface area.

Example 10—Cr(VI) Oxide Reduction Using Organic Solvents Derived from Isobutyl Alcohol Oxidation The reactor set-up and recipe of Example 4 were used herein. X g of chromic acid ($CrO_3$) and Y g of various organic solvents are depicted in the table below. As illustrated in the table below, both isobutyraldehyde and isobutyric acid may be used as an organic reducing solvent for chromium(VI) oxide level reduction. The chromium(VI) oxide content, surface area and density values illustrated in the table were measured from dried chromium(VI) oxide powder (i.e. powder that was not calcined).

TABLE 9 organic solvent effect on Cr(VI) oxide levels

| Sample | #1 (from Example 1) | #13 | #14 |
|---|---|---|---|
| Organic Solvent (Boiling Point, ° C.) | Isobutyl Alcohol (108) | Isobutyraldehyde (63) | Isobutyric acid (155) |
| X = $CrO_3$ g | 65 | 52 | 65 |
| Y = Organic Solvent, g | 48 | 75 | 114.5 |
| Y/X molar ratio | 1.0 | 2.0 | 2.0 |
| Reflux Temperature, ° C. | 92 | 71 | 98 |
| Cr(VI) oxide, ppm | 120 | 12,120 | 9,040 |
| BET, m²/g | 324 | 186 | 151 |
| Density, g/cc | 0.57 | 0.49 | 0.62 |

Example 11—Cr(VI) Oxide Reduction with Two Organic Reducing Solvents

The following reactor set-up and general recipe were used for Example 12 below. Specific alterations will be detailed in the corresponding example.

Reactor System Set-Up

A one liter 4-neck flask equipped with agitator, reflux condenser, coolant chiller, reactor heater, heater controller, temperature probe and recorder, dropping funnel, distillate receiver with ice bath, and nitrogen purge line, etc. was used for lab experiment runs.

Recipe
1) Charge 688 g of DI-H$_2$O into reactor;
2) Charge X g of chromic acid into reactor, mix for 5-10 minutes with a fixed rate of agitation for a complete solid dissolution with a uniform color;
3) Pump Y g of first organic chemical within 20 to 120 minutes under constant agitation;
4) Pump Z g of second organic chemical within 30 minutes under constant agitation either before reactor hear-up or post reflux cycle;
5) Heat the mixture inside reactor to a reflux point of a binary or ternary azeotropic phase;
6) Keep refluxing within the reactor system for a cycle time of 12-16 hours;
7) Strip off 400-415 g of a mixture of organic chemicals and water;
8) Unload the slurry into a dryer for overnight drying at 120-150° C.; and
9) Calcine the dried powder under nitrogen at 300-500° C. overnight.

Example 12—Cr(VI) Oxide Reduction Using Two Organic Solvents

The reactor set-up and recipe of Example 11 were used herein. X g of chromium(VI) oxide (CrO$_3$), Y g of ethanol, and Z g of various carboxylic acids are depicted in the table below. As illustrated in Table 10, adding carboxylic acids, such as acetic acid and isobutyric acid, successfully reduces the level of chromium(VI) oxide. For example, in a system of multiple organic solvents combining ethanol and isobutyric acid (#16), both the dried powder and the calcined powder intermediates illustrated a chromium(VI) oxide level (210 ppm). A multiple organic solvent system combining ethanol and acetic acid (#15) also generates a calcined catalyst powder with chromium(VI) oxide levels well below the regulatory limits (90 ppm). However, since the intermediate dried powder has higher content of chromium (VI) oxide, a close powder transfer system could be required for handling the Cr$_2$O$_3$ catalyst produced by the process of sample #15.

TABLE 10 multiple organic solvents effect on Cr(VI) oxide levels

| Sample | | #15 | #16 |
|---|---|---|---|
| X = CrO$_3$ g | | 55 | 65 |
| Y = Ethanol, g | | 38 | 45 |
| Y/X molar ratio | | 1.5 | 1.5 |
| Z = Carboxylic Acid, g | | Acetic Acid - 15 g Charge ethanol first then acetic acid before reactor heat-up | Isobutyric acid - 46.6 g Charge post-ethanol reflux cycle with an additional 1 hour reflux after addition |
| Z/X molar ratio | | 0.45 | 0.81 |
| Reflux Temperature, ° C. | | 90 (ternary azeotropic) | 92-binary azeotropic 94-ternary azeotropic |
| Dried Powder | Cr(VI) oxide, wt % (ppm) | 10.2 (102,000) | 0.021 (210) |
| | BET surface area, m$^2$/g | 242 | 247 |
| Calcined Powder | Cr(VI) oxide, wt % (ppm) | 0.009 (90) | 0.021 (210) |
| | BET surface area, m$^2$/g | 265 | 268 |

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "some embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more implementations.

Although the embodiments disclosed herein have been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

In addition, the term "or" is intended to mean an inclusive "or" rather than an exclusive "or." When the term "about" or "approximately" is used herein, this is intended to mean that the nominal value presented is precise within ±10%.

What is claimed is:

1. A process for preparing a chromium oxide catalyst composition, the process comprising:
forming a mixture comprising chromium(VI) oxide in an aqueous solvent and in an organic reducing solvent;
refluxing the mixture to form a slurry; and
drying the slurry to form a powder having chromium(VI) oxide at an amount of about 10,000 ppm or less based on total chromium oxides content in the powder.

2. The process of claim 1, wherein the chromium oxide catalyst composition includes pores having pore volumes ranging from about 0.2 cc/g to about 2.0 cc/g.

3. The process of claim 1, wherein the chromium oxide catalyst composition has a BET surface area of 150 $m^2/g$ or more.

4. The process of claim 1, wherein the aqueous solvent comprises water.

5. The process of claim 1, wherein the organic reducing solvent comprises an alcohol, aldehyde, carboxylic acid, or combinations thereof.

6. The process of claim 5, wherein the alcohol is one or more of methanol, ethanol, propanol, isopropanol, butanol, isobutyl alcohol, n-butanol, isoprenol, benzyl alcohol.

7. The process of claim 5, wherein the alcohol comprises isobutyl alcohol, and wherein the process comprises:
oxidizing the isobutyl alcohol to form isobutyraldehyde and isobutyric acid; and
reacting the isobutyric acid with the chromium(VI) oxide in the aqueous solvent to form acetone and carbon dioxide.

8. The process of claim 1, wherein the refluxing is performed at a temperature ranging from about 50° C. to about 250° C.

9. The process of claim 1, wherein the refluxing is performed for a time period ranging from about 30 minutes to about 24 hours.

10. The process of claim 1, wherein the powder formed is a xerogel.

11. The process of claim 1, wherein the powder formed contains chromium(VI) oxide at an amount of about 5,000 ppm or less based on total chromium oxides content present in the powder.

12. A process for preparing a chromium oxide catalyst composition, the process comprising:
forming a mixture comprising chromium(VI) oxide in an aqueous solvent and in an organic reducing solvent, wherein a molar ratio of the organic reducing solvent to the chromium(VI) oxide is in a range from about 0.2 to about 4.0;
refluxing the mixture to form a slurry, wherein the refluxing is performed at a temperature ranging from about 50° C. to about 250° C. for a time period ranging from about 30 minutes to about 24 hours; and
drying the slurry to form a powder having chromium(VI) oxide at an amount of about 10,000 ppm or less based on total chromium oxides content in the powder.

13. The process of claim 12, wherein the chromium oxide catalyst composition includes pores having pore volumes ranging from about 0.2 cc/g to about 2.0 cc/g.

14. The process of claim 12, wherein the refluxing is performed at a temperature ranging from about 70° C. to about 150° C.

15. The process of claim 12, wherein the aqueous solvent comprises water.

16. The process of claim 12, wherein the organic reducing solvent comprises an alcohol, aldehyde, carboxylic acid, or combinations thereof.

17. The process of claim 16, wherein the alcohol is one or more of methanol, ethanol, propanol, isopropanol, butanol, isobutyl alcohol, n-butanol, isoprenol, benzyl alcohol.

18. The process of claim 12, wherein the powder formed is a xerogel.

19. The process of claim 12, wherein the powder formed contains chromium(VI) oxide at an amount of about 5,000 ppm or less based on total chromium oxides content present in the powder.

* * * * *